(12) United States Patent
Coraluppi

(10) Patent No.: US 12,143,490 B1
(45) Date of Patent: Nov. 12, 2024

(54) METHOD, SOFTWARE AND APPARATUS FOR COMPUTING DISCRETE LOGARITHMS MODULO A PRIME

(71) Applicant: Giorgio Coraluppi, Pittsburgh, PA (US)

(72) Inventor: Giorgio Coraluppi, Pittsburgh, PA (US)

(73) Assignee: Chorus Call, Inc., Monroeville, PA (US)

( * ) Notice: Subject to any disclaimer, the term of this patent is extended or adjusted under 35 U.S.C. 154(b) by 0 days.

(21) Appl. No.: 16/802,018

(22) Filed: Feb. 26, 2020

Related U.S. Application Data

(63) Continuation-in-part of application No. 15/875,737, filed on Jan. 19, 2018, now Pat. No. 10,579,337, which is a continuation-in-part of application No. 14/886,404, filed on Oct. 19, 2015, now abandoned.

(60) Provisional application No. 62/181,322, filed on Jun. 18, 2015.

(51) Int. Cl.
| | | |
|---|---|---|
| *H04L 9/30* | (2006.01) | |
| *G06F 7/483* | (2006.01) | |
| *G06F 7/552* | (2006.01) | |
| *G06F 7/556* | (2006.01) | |
| *G06F 7/72* | (2006.01) | |

(52) U.S. Cl.
CPC .......... *H04L 9/3013* (2013.01); *G06F 7/4833* (2013.01); *G06F 7/552* (2013.01); *G06F 7/556* (2013.01); *G06F 7/72* (2013.01)

(58) Field of Classification Search
CPC ..... H04L 9/3013; G06F 7/4833; G06F 7/552; G06F 7/756; G06F 7/72
See application file for complete search history.

(56) References Cited

U.S. PATENT DOCUMENTS

| | | | | |
|---|---|---|---|---|
| 6,285,761 B1* | 9/2001 | Patel | ...................... | H04L 9/0662 380/44 |
| 6,480,605 B1* | 11/2002 | Uchiyama | ............. | H04L 9/3066 713/180 |
| 7,031,468 B2* | 4/2006 | Hoffstein | ................ | G06F 7/723 708/255 |
| 7,286,665 B1* | 10/2007 | Wang | ...................... | H04L 9/002 380/282 |
| 2002/0007457 A1* | 1/2002 | Neff | ........................ | H04L 9/321 713/180 |

(Continued)

OTHER PUBLICATIONS

Extremely fast method for modular exponentiation with modulus and exponent of several million digits, downloaded from http// stackoverlow.com/ questions; Stack Exchange Inc. (Year: 2015).*

(Continued)

*Primary Examiner* — Shanto Abedin
(74) *Attorney, Agent, or Firm* — Ansel M. Schwartz

(57) ABSTRACT

A decoding apparatus having a non-transient memory in which is stored an electromagnetic signal representative of data which were encrypted relying on the difficulty of computing discrete logarithms. The decoding apparatus has a computer in communication with the memory that decodes the encrypted data in the memory by computing the data's discrete logarithm. The decoding apparatus has a display on which the decoded encrypted data are displayed by the computer. A method for decoding.

1 Claim, 2 Drawing Sheets

(56) References Cited

U.S. PATENT DOCUMENTS

| | | | |
|---|---|---|---|
| 2002/0062330 A1* | 5/2002 | Paar | G06F 7/724 |
| | | | 708/492 |
| 2002/0186837 A1* | 12/2002 | Hopkins | H04L 9/3033 |
| | | | 380/28 |
| 2003/0120944 A1* | 6/2003 | Kim | G06F 7/72 |
| | | | 713/193 |
| 2007/0118746 A1* | 5/2007 | Lauter | H04L 9/3073 |
| | | | 713/170 |
| 2010/0046741 A1* | 2/2010 | Isogai | H04L 9/3013 |
| | | | 380/28 |

OTHER PUBLICATIONS

Ryan Williams et al, Finding orthogonal vectors in discrete structures, Society for Industrial and Applied Mathematics. (Year: 2014).*
Machine translation of Japanese patent application No. JP H0548599 A, M. Natsume et al. (Year: 1991).*

* cited by examiner

REPRESENTATION OF $\rho_1{}^{x_1} \cdot \rho_2{}^{x_2} \pmod{70}$

USING ORTHOGONAL PRIMITIVES

METHOD, SOFTWARE AND APPARATUS FOR COMPUTING DISCRETE LOGARITHMS MODULO A PRIME

CROSS-REFERENCE TO RELATED APPLICATIONS

This is a continuation-in-part of U.S. patent application Ser. No. 15/875,737 filed Jan. 19, 2018, now U.S. Pat. No. 10,579,337, which is a continuation-in-part of U.S. patent application Ser. No. 14/886,404 filed Oct. 19, 2015, which claims priority from U.S. provisional application Ser. No. 62/181,322 filed Jun. 18, 2015, all of which are incorporated by reference herein.

I. FIELD OF THE INVENTION

The present invention considers the exponential congruence $$a_0^x \equiv y_0 \pmod{p} \qquad (1)$$

where p is prime and $a_0$ is a primitive root modulo p. Since $a_0$ is primitive, x and $y_0$ are in a one-to-one correspondence for integer values in the range $1 \leq x$, $y_0 \leq p-1$ [3]. Let G denote the set of integers $\{1, 2, \ldots, p-1\}$ and let $|G|$ denote their number. Given p and $a_0$ and given $y_0$ in G, it is desired to find x modulo p−1. The integer x is usually referred to as the discrete logarithm of $y_0$ in base $a_0$ modulo p. (As used herein, references to the "present invention" or "invention" relate to exemplary embodiments and not necessarily to every embodiment encompassed by the appended claims.)

BACKGROUND OF THE INVENTION

Pohlig and Hellman discussed the significance of this problem for cryptographic systems [3]. It was concluded by Pohlig and Hellman that, if p−1 has only small prime factors, x can be computed in a time of the order of $\log^2 p$. However, if p−1 has a large prime factor p', the search for x requires a time of the order of p'·log p and may be untractable. As an illustration, Pohlig and Hellman presented two large primes of the form p=2·p'+1, where p' is also prime and where $$p' = 2^{13} \cdot 5 \cdot 7 \cdot 11 \cdot 13 \cdot 17 \cdot 19 \cdot 23 \cdot 29 \cdot 31 \cdot 37 \cdot 41 \cdot 43 \cdot 47 \cdot 53 \cdot 59 + 1 \qquad (2)$$

or $$p' = 2^{121} \cdot 5^2 \cdot 7^2 \cdot 11^2 \cdot 13 \cdot 17 \cdot 19 \cdot 23 \cdot 29 \cdot 31 \cdot 37 \cdot 41 \cdot 43 \cdot 47 \cdot 53 \cdot 59 + 1 \qquad (3)$$

In general, let p=2·p'+1, where p' is prime and $$p' - 1 = 2^{\varepsilon_0} \cdot q_1^{\varepsilon_1} \cdot q_2^{\varepsilon_2} \cdots q_i^{\varepsilon_i} \cdots q_h^{\varepsilon_h}, \qquad (4)$$

where $\varepsilon_0 \geq 1$ and, for $1 \leq i \leq h$, $q_i$ denotes an odd prime and $\varepsilon_i > 0$. Also, for $1 \leq i < h$, $2 < q_i < q_{i+1}$.

NOTE 1: Pohlig and Hellman observed that $q_1 \neq 3$. In fact p=2·p'+1=2·(p'−1)+3. Since p is prime, it must be gcd (3, p'−1)=1.

NOTE 2: Let X denote the set of elements of G which are relatively prime to p−1 and let A denote the set of primitive roots modulo p. Then $|X| = |A| = \varphi(p-1)$, where $\varphi(n)$ denotes the Euler totient function.

NOTE 3: The elements of X form a commutative (abelian) group under the operation of multiplication modulo p−1. An integer $m \geq 1$ has a primitive root if and only if m=1, 2, 4, $p^d$ or $2 \cdot p^d$, where p is prime number and a is a positive integer [1, p. 211]. When X is cyclic, there exist integers ρ which are primitive roots of X modulo p−1. When primitive roots of X exist, let Y denote the set of elements of X which are primitive roots of X modulo p−1.

NOTE 4: Section VIII below shows that, when p'−1 can be described as in (4), X is cyclic only if $\varepsilon_0 < 3$

BRIEF SUMMARY OF THE INVENTION

The present invention introduces an algorithm which, when p=2·p'+1, p' is prime and p'−1 contains only small prime factors, produces the solution of (1) in a time of the order of loglog p·$\log^2$p.

The present invention pertains to a decoding apparatus. The decoding apparatus comprises a non-transient memory in which is stored an electromagnetic signal representative of data which were encrypted relying on the difficulty of computing discrete logarithms. The decoding apparatus comprises a computer in communication with the memory that decodes the encrypted data in the memory by computing the data's discrete logarithm. The decoding apparatus comprises a display on which the decoded encrypted data are displayed by the computer.

The present invention pertains to a method for processing an electromagnetic signal representative of encrypted data which were produced relying on the difficulty of computer discrete logarithms, comprising a first computer. The method comprises the steps of storing the encrypted data in a non-transient memory of a second computer. There is the step of performing with the second computer in communication with the memory the computer-generated steps of decoding the encrypted data in the memory by computing the data's discrete logarithms, and displaying on a display the decoded data.

The present invention pertains to a computer program stored in a non-transient memory for decoding an electromagnetic signal which is encrypted relying on the difficulty of computing discrete logarithms. The program has the computer-generated steps of storing the encrypted data in a non-transient memory. There is the step of decoding the encrypted data in the memory by computing the data's discrete logarithms. There is the step of displaying on a display the decoded data.

The present invention pertains to a method for reducing the complexity of an exponential congruence, preferably for decoding, which is defined modulo p, where p=2·p'+1, p' is also a prime and p'−1 contains only factors which are smaller than 100,000. The method comprises the steps of executing with a computer a sequence of reversible transformations supported by a non-transient memory in such a way that the exponential congruence modulo p is restated as a problem involving new relationships modulo p and a concurrent independent congruence modulo p−1. There is the step of reporting the restated problem on a display.

The present invention pertains to a method for decoding. The method comprises the steps of selecting with a computer primitives of sub-groups of a group stored in a non-transient memory, where the group is defined modulo $\varphi(p-1)$ in such a way that an exponent of any one primitive is independent on an exponent of any other primitive, thus reducing the complexity of a search for such exponents to a number of operations of the order of a sum of such exponents as opposed to their product. There is the step of reporting the exponents on a display.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
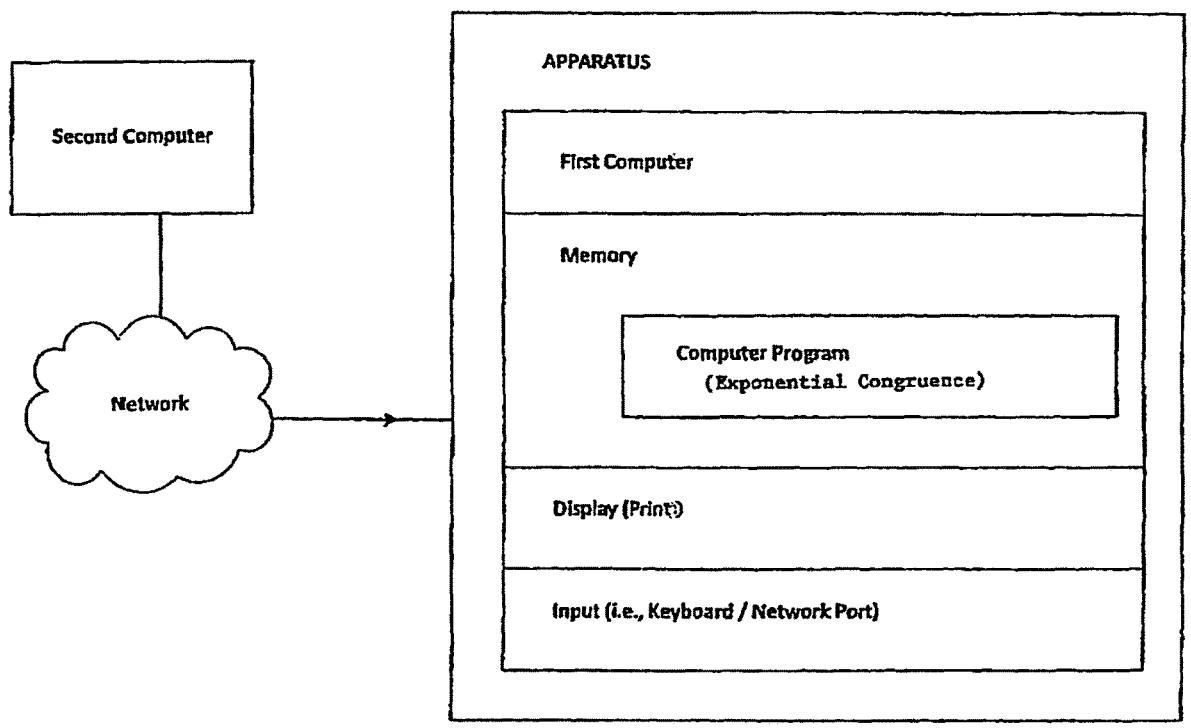
FIG. 1 is a block diagram of the apparatus of the claimed invention.
Figure 2:
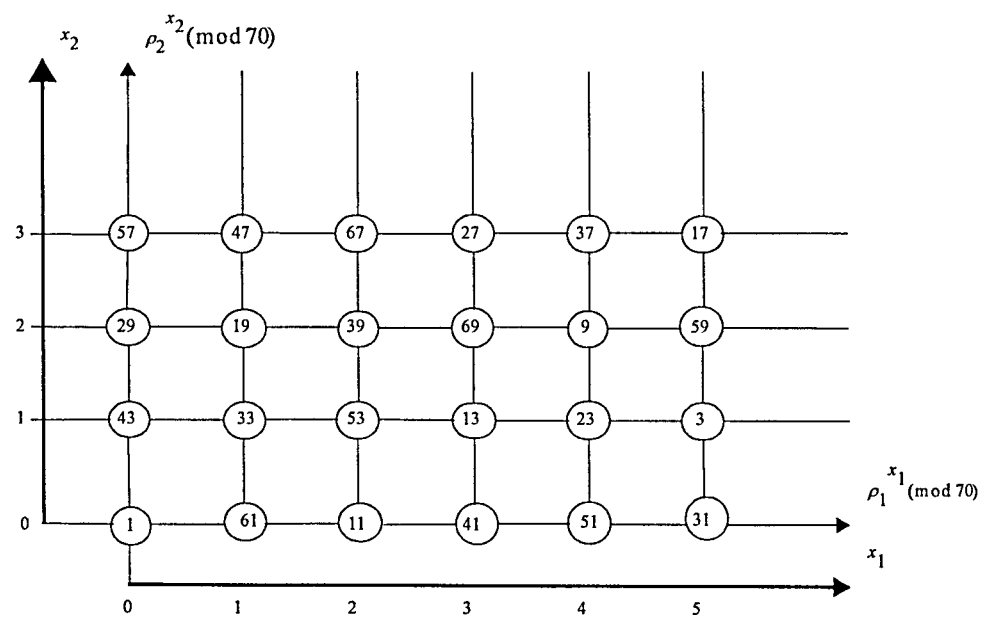
FIG. 2 is a representation of $\rho_1^{x_1} \cdot \rho_2^{x_2}$ (mod 70) using orthogonal primitives.

Referring now to the drawings wherein like reference numerals refer to similar or identical parts throughout the several views, and more specifically to FIG. 1 thereof, there is shown a decoding apparatus 10. The decoding apparatus 10 comprises a non-transient memory 14 in which is stored an electromagnetic signal representative of data which were encrypted relying on the difficulty of computing discrete logarithms. The decoding apparatus 10 comprises a computer 12 in communication with the memory 14 that decodes the encrypted data in the memory 14 by computing the data's discrete logarithm. The decoding apparatus 10 comprises a display 18 on which the decoded encrypted data are displayed by the computer 12.

The computer 12 may reduce the complexity of an exponential congruence which is defined modulo p, where p=2·p'+1, p' is also a prime and p'−1 contains only factors which are smaller than 100,000, and executes a sequence of reversible transformations supported by the non-transient memory 14 in such a way that the exponential congruence modulo p is restated as a problem involving new relationships modulo p and a concurrent independent congruence modulo p−1. The computer 12 may select primitives of sub-groups of a group stored in the non-transient memory 14, where the group is defined modulo φ(p−1) in such a way that an exponent of any one primitive is independent on an exponent of any other primitive, thus reducing the complexity of a search for such exponents to a number of operations of the order of a sum of such exponents as opposed to their product.

The present invention pertains to a method for processing an electromagnetic signal representative of encrypted data which were produced relying on the difficulty of computing discrete logarithms. The method comprises the steps of producing the electromagnetic signal by a first computer 12. There is the step of providing the signal to a second computer 22 through an input 20 of the second computer 22. The input 20 can be a keyboard in communication with the second computer 22 or a memory port, such as a USB port that receives a flash drive or a CD reader that receives a CD with the signal; or the input 20 can be a network interface card in communication with the second computer 22 having a network port which is in communication with a network 24 over which the signal is transmitted from the first computer 12. The second computer 22 obtains the signal from the network 24 through the input 20 of the second computer 22. There is the step of storing the encrypted data in a non-transient memory 14 of a second computer 22. There is the step of performing with the second computer 22 in communication with the memory 14 the computer-generated steps of decoding the encrypted data in the memory 14 by computing the data's discrete logarithms, and displaying on a display 18 the decoded data.

The performing step may include the steps of reducing the complexity of an exponential congruence which is defined modulo p, where p=2·p'+1, p' is also a prime and p'−1 contains only factors which are smaller than 100,000. There may be the step of executing with the computer a sequence of reversible transformations supported by a non-transient memory 14 in such a way that the exponential congruence modulo p is restated as a problem involving new relationships modulo p and a concurrent independent congruence modulo p−1. There may be the step of reporting the restated problem on a display 18. The performing step may include the step of selecting with the computer primitives of sub-groups of a group stored in the non-transient memory 14, where the group is defined modulo φ(p−1) in such a way that an exponent of any one primitive is independent on an exponent of any other primitive, thus reducing the complexity of a search for such exponents to a number of operations of the order of a sum of such exponents as opposed to their product.

The present invention pertains to a computer program 16 stored in a non-transient memory 14 for decoding an electromagnetic signal which is encrypted relying on the difficulty of computing discrete logarithms. The program has the computer-generated steps of storing the encrypted data in a non-transient memory 14. There is the step of decoding the encrypted data in the memory 14 by computing the data's discrete logarithms. There is the step of displaying on a display 18 the decoded data.

The decoding step may include the steps of reducing the complexity of an exponential congruence which is defined modulo p, where p=2·p'+1, p' is also a prime and p'−1 contains only factors which are smaller than 100,000. There may be the step of executing with the computer a sequence of reversible transformations supported by a non-transient memory 14 in such a way that the exponential congruence modulo p is restated as a problem involving new relationships modulo p and a concurrent independent congruence modulo p−1.

The decoding step may include the steps of selecting with the computer primitives of sub-groups of a group stored in the non-transient memory 14, where the group is defined modulo φ(p −1) in such a way that an exponent of any one primitive is independent on an exponent of any other primitive, thus reducing the complexity of a search for such exponents to a number of operations of the order of a sum of such exponents as opposed to their product.

The present invention pertains to a method for reducing the complexity of an exponential congruence, preferably for decoding, which is defined modulo p, where p=2·p'+1, p' is also a prime and p'−1 contains only factors which are smaller than 100,000. The method comprises the steps of executing with a computer a sequence of reversible transformations supported by a non-transient memory 14 in such a way that the exponential congruence modulo p is restated as a problem involving new relationships modulo p and a concurrent independent congruence modulo p−1. There is the step of reporting the restated problem on a display 18.

The present invention pertains to an apparatus 10 for reducing the complexity of an exponential congruence, preferably for decoding, which is defined modulo p, where p=2·p'+1, p' is also a prime and p'−1 contains only factors which are smaller than 100,000. The apparatus 10 comprises a non-transient memory 14. The apparatus 10 comprises a computer in communication with the non-transient memory 14 which executes a sequence of reversible transformations supported by the non-transient memory 14 in such a way that the exponential congruence modulo p is restated as a problem involving new relationships modulo p and a concurrent independent congruence modulo p−1. The apparatus 10 comprises a display 18 on which the restated problem is reported.

The present invention pertains to a computer program 16 stored in a non-transient memory 14 for reducing the complexity of an exponential congruence, preferably for decoding, which is defined modulo p, where p=2·p'+1, p' is also a prime and p'−1 contains only factors which are smaller than 100,000. The program comprises the computer generated steps of executing a sequence of reversible transformations supported by a non-transient memory 14 in such a way that the exponential congruence modulo p is restated as a problem involving new relationships modulo p and a concurrent independent congruence modulo p−1. There is the step of reporting the restated problem on a display 18.

The present invention pertains to a method for decoding. The method comprises the steps of selecting with a computer primitives of sub-groups of a group stored in a non-transient memory 14, where the group is defined modulo φ(p−1) in such a way that an exponent of any one primitive is independent on an exponent of any other primitive, thus reducing the complexity of a search for such exponents to a number of operations of the order of a sum of such exponents as opposed to their product. There is the step of reporting the exponents on a display 18.

The present invention pertains to a computer program 16 stored in a non-transient memory 14 for decoding. The program comprises the computer generated steps of selecting primitives of sub-groups of a group stored in a non-transient memory 14, where the group is defined modulo φ(p−1) in such a way that an exponent of any one primitive is independent on an exponent of any other primitive, thus reducing the complexity of a search for such exponents to a number of operations of the order of a sum of such exponents as opposed to their product. There is the step of reporting the exponents on a display 18.

The present invention pertains to an apparatus 10 for decoding. The apparatus 10 comprises a non-transient memory 14. The apparatus 10 comprises a computer in communication with the memory 14 which selects primitives of sub-groups of a group stored in the non-transient memory 14, where the group is defined modulo φ(p−1) in such a way that an exponent of any one primitive is independent on an exponent of any other primitive, thus reducing the complexity of a search for such exponents to a number of operations of the order of a sum of such exponents as opposed to their product. The apparatus 10 comprises a display 18 in communication with the computer on which the exponents are reported.

In the operation of the invention, the following is a description of the solution of (1).

II. THE CASE WHEN $\varepsilon_0 = 1$. A RESTATEMENT

1) Step One. Definition of "Superprimitives".

In general in (1) $a_0$ is not a primitive root of X modulo p−1. It is convenient to restate (1) in such a way that on the LHS of (1) $a_0$ be replaced by a primitive of X modulo p−1.

If ρ denotes a primitive of X modulo p−1, consider the process of raising both sides of (1) by $\rho^l$. As l increases, $a_0^{\rho^l}$ modulo p traces an orbit of primitives modulo p.

If p is large, and if p=2·p'+1, where p' is also prime, approximately half of the elements of G are elements of this orbit [2, p. 269].

For some integer $\tilde{l}$, $a_0^{\rho^{\tilde{l}}}$ is also a primitive of X modulo p−1. In this case, define $$\begin{cases} a_0^{\rho^{\tilde{l}}} \equiv a \pmod{p} \\ y_0^{\rho^{\tilde{l}}} \equiv y \pmod{p} \end{cases} \quad (5)$$

Then $$a^x \equiv y \pmod{p}. \quad (6)$$

An integer which is a primitive root of p and also a primitive of X modulo p−1 will be referred to as a superprimitive of p.

Table I shows the superprimitives of a set of small primes ($\varepsilon_0 \leq 2$).

Table II shows some relevant variables for such primes.

TABLE I

| p | Superprimitives of p |
|---|---|
| 11 | 7 |
| 23 | 7, 17, 19 |
| 47 | 5, 11, 15, 19, 33, 43 |
| 59 | 11, 31, 37, 39, 43, 47, 55 |
| 107 | 5, 21, 31, 45, 51, 55, 65, 67, 71, 73, 103 |
| 167 | 5, 13, 15, 35, 39, 43, 45, 53, 55, 67, 71, 73, 79, 91, 101, 103, 105, 117, 125, 129, 135, 139, 143, 145, 149, 155, 159, 163 |
| 263 | 29, 57, 67, 85, 87, 97, 115, 119, 127, 130, 139, 141, 161, 171, 185, 197, 213, 219, 227, 229, 237, 241, 247, 251, 255, 257, 259 |
| 347 | 5, 7, 17, 19, 45, 63, 65, 69, 79, 91, 97, 101, 103, 111, 123, 125, 141, 145, 153, 155, 165, 171, 175, 191, 193, 203, 215, 217, 221, 223, 231, 239, 245, 247, 283, 301, 307, 335, 343, |
| 359 | 7, 21, 35, 53, 63, 71, 97, 103, 105, 109, 113, 119, 137, 143, 157, 159, 163, 167, 175, 189, 197, 209, 211, 213, 223, 251, 257, 263, 265, 269, 271, 277, 291, 293, 299, 309, 311, 313, 315, 319, 327, 329, 339, 341, 343, 349, 353, 355 |
| 383 | 33, 35, 47, 53, 61, 83, 89, 91, 95, 99, 105, 111, 123, 127, 131, 141, 145, 151, 157, 167, 179, 181, 183, 187, 233, 247, 249, 253, 267, 285, 297, 307, 315, 337, 355, 359, 365, 367, 369, 379 |
| 479 | 13, 19, 37, 39, 41, 43, 47, 53, 57, 59, 65, 79, 95, 117, 119, 123, 129, 143, 149, 159, 171, 177, 179, 185, 191, 205, 209, 223, 227, 235, 237, 265, 281, 285, 295, 317, 325, 333, 351, 353, 357, 369, 379, 387, 391, 395, 423, 429, 433, 447, 449, 451, 461, 463, 467, 469, 473, 475 |
| 503 | 19, 29, 37, 53, 55, 57, 71, 87, 107, 109, 111, 127, 133, 137, 139, 159, 163, 165, 167, 191, 193, 203, 213, 215, 239, 269, 277, 295, 305, 307, 313, 321, 327, 333, 341, 347, 349, 371, 381, 385, 399, 409, 417, 419, 437, 453, 457, 461, 467, 471, 475, 479, 481, 485, 487, 489, 495, 499 |
| 587 | 5, 11, 13, 19, 23, 41, 45, 85, 99, 103, 105, 111, 117, 125, 127, 131, 139, 157, 171, 173, 183, 187, 207, 213, 215, 221, 227, 231, 241, 245, 251, 259, 265, 263, 273, 275, 291, 295, 321, 323, 325, 327, 335, 337, 341, 365, 367, 369, 373, 391, 399, 403, 405, 415, 427, 435, 467, 473, 475, 483, 487, 497, 523, 539, 541, 557, 559, 583 |

TABLE II

| p | \|A\| = \|X\| | \|Y\| | \|A ∩ Y\| | \|A\|/(A ∩ Y) |
|---|---|---|---|---|
| 11 | 4 | 2 | 1 | 4.0000 |
| 23 | 10 | 4 | 3 | 3.3333 |
| 47 | 22 | 10 | 6 | 3.6666 |
| 59 | 28 | 12 | 7 | 4.0000 |
| 107 | 52 | 24 | 11 | 4.7273 |
| 167 | 82 | 40 | 28 | 2.9286 |
| 263 | 130 | 48 | 26 | 5.0000 |
| 347 | 172 | 84 | 39 | 4.4103 |
| 359 | 178 | 88 | 48 | 3.7083 |
| 383 | 190 | 72 | 40 | 4.7500 |
| 479 | 238 | 96 | 58 | 4.1034 |
| 503 | 250 | 100 | 58 | 4.3103 |
| 587 | 292 | 144 | 68 | 4.2941 |

NOTE 1: If $\varepsilon_0 \leq 2$, X is cyclic and there exist an integer ρ which is a primitive root of X modulo p−1. If p is large, to determine ρ it is sufficient to select any random integer and to verify that a) ρ is an element of X, which means that it is relatively prime to p−1, and b) ρ is an element of Y, which means that it is relatively prime to φ(p−1)=p'−1. The process of producing p should not be long, because, if p is large, the probability that two integers be prime to one another is $6/\pi^2$ [2, p. 269]. Thus, the probability that an integer chosen at random be prime to p−1 and p'−1 is approximately $(6/\pi^2)^2$ or 1/2.7055.

NOTE 2: The ratio $|A|/|(A \cap Y)|$ is relevant because it is related to the number of trials which should be expected when is employed in the search for a.
NOTE 3: The ratio $|A|/|(A \cap Y)|$ may grow when p increases. As an example, when p=6466463=2·p'+1 and p'=2·5·7·11·13·17·19+1, $|A|/|A \cap Y|$=7.7931.
NOTE 4: Comparing the data for $p_2$=6466463 and $p_1$=587, observe that, when $p_1$ is replaced by $p_2$, the ratio $|A|/|(A \cap Y)|$ is multiplied by a factor of 7.7931/4.2941, which is less than 2, while 6466463 is greater than $587^2$.

2) Step Two

In general in (6) y is not a primitive root modulo p. It is convenient to restate (6) in such a way that the RHS of (6) be a primitive modulo p. This can be accomplished by multiplying both sides of (6) by a, a sufficient number of times until the desired condition is satisfied. If after $\tilde{r}$ iterations this condition is satisfied, let $$\begin{cases} b \equiv a^{\tilde{r}} \cdot y \pmod{p} \\ s \equiv x + \tilde{r} \pmod{p-1} \end{cases}. \tag{7}$$

Then $$a^s \equiv b \pmod{p}. \tag{8}$$

After this restatement the search for x is conducted in a smaller, more structured environment. Since b is a primitive modulo p and a is a primitive of X modulo p−1, s is relative prime to p−1 and can be represented as follows $$\begin{cases} s \equiv a^t \pmod{(p-1)} \\ a^{a^t} \equiv b \pmod{p} \end{cases}, \tag{9}$$

where t denotes an integer and $0 \le t < \varphi(p-1)$.

3) Step Three

Consider the process of raising the second of (9) to $a^u$ modulo p. Let d denote the least positive residue modulo p of the corresponding RHS of (9). As u increases, the integer d describes an orbit of primitives modulo p. It is desired that d be also a primitive of X modulo p−1. If, after $\tilde{u}$ operations this condition is satisfied, define $$a^{a^v} \equiv d \pmod{p} \tag{10}$$

where $$\begin{cases} v \equiv t + \tilde{u} \pmod{\varphi(p-1)} \\ d \equiv b^{a^{\tilde{u}}} \pmod{p} \end{cases}. \tag{11}$$

Consider the integer $d^{d^w}$, where w denotes an integer. Since d is a primitive modulo p and a primitive of X modulo p−1, when w varies $d^{d^w}$ traces an orbit which contains all the primitives modulo p, including a.

Therefore, there does exist an integer w such that $$a \equiv d^{d^w} \pmod{p}. \tag{12}$$

4) Conclusion

The exponential congruence (1) is referred to as a "one-way" transaction, meaning that, when x is known, it is easy to compute $a_0^x$ modulo p, while, when $y_0$ is known, the computation of x may be untractable. The restatement introduced by this section produces the congruences (10) and (12), which have similar structure and comparable complexity.

In order to determine the relationship between v and w, raise (12) to $a^v$ modulo p. It will be $$a^{a^v} \equiv d^{a^v \cdot d^w} \pmod{p} \tag{13}$$

whence, by (10), $$a^v \cdot d^w \equiv 1 \pmod{p-1} \tag{14}$$

or $$a^v \equiv d^{-w} \pmod{p-1}. \tag{15}$$

As a conclusion: v and w are exponents of known superprimitives of p, a and d, respectively. The integers $a^v$ and $d^w$ are related in a congruence which is defined modulo p−1.
NOTE 1: In general, given (1), the integers a and d which result from the proposed restatements are not unique.
NOTE 2: In principle, it would be possible to explore the case when a is a superprimitive of p and p−1. As an example, 19 is a superprimitive of 47 and 23. However, not all primes have superprimitives modulo p and modulo p−1.

III. ORTHOGONAL PRIMITIVES when $\varepsilon_0$=1

Refer to (15). Let V denote the set of integers v and w ($1 \le v, w \le p'-1$) which are candidate solutions of (10), (12), and (15) and let $|V|$ denote their number.

A) It is desired to represent V as the direct product of distinct subsets of V, each one associated with one of the factors ($q_i^{\varepsilon_1}$ or $2^{\varepsilon_0}$) of p'−1.

B) It is desired to partition and process independently the corresponding sets of candidate solutions.

To reach these aims:

A) The number of significant candidate elements associated with each of such sets is $\varphi(q_i^{\varepsilon_1})$. Then the total number of candidate elements, say $|V|$, would be $$|V| = \varphi(p'-1) = 2^{\varepsilon_0 - 1} \cdot \prod_{i=1}^{h} \varphi(q_i^{\varepsilon_i}). \tag{16}$$

The candidate elements associated to $\varphi(q_i^{\varepsilon_1})$, say $\rho_i^{v_1}$, are relatively prime to $q_i$ and can be represented as the elements of a cyclic group having $\rho_i$ as its generator.

Notice that, thus far, nothing has been stated concerning the divisibility of $\rho_i$ by $q_j$ when i≠j.

B) Consider the case when v and w are represented as the direct product of their component subgroups. In the case when $\varepsilon_0$=1, $\varepsilon_0$−1=0. In order to process independently the cyclic subsets of V, consider the case when the primitive of the cycle i is defined as follows:

$$\rho_i = 1 + \lambda_i \cdot \varphi(p-1)/q_i^{\varepsilon_i} = \sigma_i + \mu_i \cdot q_i^{\varepsilon_i} \tag{17}$$

where $\sigma_i$ denotes any primitive modulo $q_i$ and ($\lambda_i, \mu_i$) denotes a pair of integers. Given $\sigma_i$, the pair ($\lambda_i, \mu_i$) can be any one of the solution pairs of the following:

$$\sigma_i - 1 + \mu_i \cdot q_i^{\varepsilon_1} = \lambda_i \cdot \varphi(p-1)/q_i^{\varepsilon_1}. \tag{18}$$

Given any solution pair ($\tilde{\lambda}_i, \tilde{\mu}_i$), its substitution into (17) produces $\rho_i$ modulo $\varphi(p-1)$. After this restatement, $\rho_i$ is relatively prime to $\varphi(p-1)$.

Consider the case when p'−1 has a structure of the form (2) or (3), that is
- a) 5 is the smallest odd prime divisor of p'−1, and
- b) each divisor $q_i$ is the smallest odd prime greater than $q_{i-1}$.

Under these conditions, all the odd prime divisors of $\varphi(p'-1)$, with the exception of 3, are also divisors of $\varphi(p-1)$. It is possible to select $\sigma_i$ in such a way that $\rho_i$ is not a multiple of 3. In this case, $\rho_i^{v_i}$ is relatively prime with $\varphi(p-1)$ and $\varphi(p'-1)$.

Thus, when p'−1 has the structure of (8) and (10) and v is relatively prime with $\varphi(p-1)$ and 3, it is possible to represent v and w as follows $$\begin{cases} v \equiv \prod_{i=1}^{h} \rho_j^{v_i} (\bmod\, \varphi(p-1)) \\ w \equiv \prod_{i=1}^{h} \rho_i^{w_i} (\bmod\, \varphi(p-1)), \end{cases} \quad (19)$$

where $v_i$ and $w_i$ denote integers defined modulo $\varphi(q_i^{\varepsilon_1})$. It will be $$\begin{cases} \frac{\varphi(p-1)}{q_i^{\varepsilon_i}} \cdot \rho_j \equiv \frac{\varphi(p-1)}{q_i^{\varepsilon_i}} (\bmod\, \varphi(p-1)) \text{ for } i \neq j \\ \frac{\varphi(p-1)}{q_i^{\varepsilon_i}} \cdot \rho_j \equiv \frac{\varphi(p-1)}{q_i^{\varepsilon_i}} \cdot \sigma_j (\bmod\, \varphi(p-1)) \text{ for } i = j. \end{cases} \quad (20)$$

The congruences (20) define the orthogonality between $\rho_i$ and $\rho_j$, for $i \neq j$, and validate the definition of $\rho_i$ offered by (17).

Notice that the definitions (17) imply that $$\rho_i^{\varphi(q_i^{\varepsilon_i})} \equiv 1 (\bmod\, \varphi(p-1)). \quad (21)$$

In fact, $$\rho_i^{\varphi(q_i^{\varepsilon_i})} = (\sigma_i + \mu_i \cdot q_i^{\varepsilon_i})^{\varphi(q_i^{\varepsilon_i})} \equiv 1 + \chi_i \cdot q_i^{\varepsilon_i} (\bmod\, q_i^{\varepsilon_i}) \quad (22)$$

and also, for all positive integers n, $$\rho_i^n = (1 + \lambda_i \cdot \varphi(p-1)/q_i^{\varepsilon_i})^n = 1 + \psi_i \cdot \varphi(p-1) q_i^{\varepsilon_i} \quad (23)$$

for some $\chi_i$ and $\Psi_i$ integers. Combining (22) and (23), (21) follows.
Refer to Section I of the Appendix.

IV. THE RELATIONSHIP BETWEEN $v_i$ AND $w_i$ MODULO $\varphi(q_i^{\varepsilon_i})$ WHEN $\varepsilon_0 = 1$ Using orthogonal primitives (17), consider raising (15) to $$\frac{\varphi(p-1)}{q_i^{\varepsilon_i}}$$

modulo p−1.

It will be $$\left(a^{\frac{\varphi(p-1)}{q_i^{\varepsilon_i}}}\right)^{\sigma_i^{v_i}} \equiv \left(d^{\frac{\varphi(p-1)}{q_i^{\varepsilon_i}}}\right)^{-\sigma_i^{w_i}} (\bmod\, (p-1)). \quad (24)$$

Let $$\begin{cases} \alpha_i \equiv a^{\frac{\varphi(p-1)}{q_i^{\varepsilon_i}}} (\bmod(p-1)) \\ \delta_i \equiv d^{\frac{\varphi(p-1)}{q_i^{\varepsilon_i}}} (\bmod\, (p-1)) \end{cases} \quad (25)$$

Then $$\alpha_i^{\sigma_i^{v_i}} \equiv \delta_i^{-\sigma_i^{w_i}} (\bmod(p-1)). \quad (26)$$

This congruence establishes a relationship between $v_i$ and $w_i$ which does not depend on any of the values of $v_j$ and $w_j$, for $i \neq j$. In fact, given $\tilde{v}_i$, the condition (26) defines $\tilde{w}_i$ modulo $\varphi(q_i^{\varepsilon_1})$.

NOTE 1: In (26), let $w_{i,m}$ denote the value of $w_i$ when $v_i \equiv 0 (\bmod\, \varphi(q_i^{\varepsilon_1}))$. Then $$\alpha_i^{-1} \equiv \delta_i^{\sigma_i^{w_{i,m}}} (\bmod\, p-1). \quad (27)$$

Likewise, let $v_{i,m}$ denote the value of $v_i$ when $w_i \equiv 0 (\bmod\, \varphi(q_i^{\varepsilon_1}))$. Then $$\alpha_i^{\sigma_i^{v_{i,m}}} \equiv \delta_i^{-1} (\bmod\, p-1). \quad (28)$$

NOTE 2: Consider the case when all the $v_j$'s are congruent to zero modulo $\varphi(q_j^{\varepsilon_j})$. In this case, from (15), $$a^{-1} \equiv d^{\prod_{j=1}^{h} \rho_j^{w_{j,m}}} (\bmod\, p-1). \quad (29)$$

Let $$W = \prod_{j=1}^{h} \rho_j^{w_{j,m}}. \quad (30)$$

Then $$a^{-1} \equiv d^W (\bmod\, p-1). \quad (31)$$

Likewise, consider the case when all the $w_j$'s are congruent to zero modulo $\varphi(q_j^{249_j})$. In this case $$a^{\prod_{j=1}^{h} \rho_j^{v_{j,m}}} \equiv d^{-1} (\bmod\, p-1). \quad (32)$$

Let $$U = \prod_{j=1}^{h} \rho_j^{v_{j,m}}. \quad (33)$$

Then $$a^U \equiv d^{-1} \pmod{p-1}. \tag{34}$$

NOTE 3: Consider the case when all the $v_j$'s other than $v_i$ are congruent to zero modulo $\varphi(q_j^{\varepsilon_j})$.
Assume $v_i \not\equiv 0 \pmod{\varphi(q_i^{\varepsilon_i})}$ and $v_j \equiv 0 \pmod{\varphi(q_j^{\varepsilon_j})}$ for $i \neq j$.
In this case, using (31), it will be $$a^{-\rho_i^{\tilde{v}_i}} \equiv d^{\rho_\iota^{\tilde{w}_i} \cdot \left(W/\rho_\iota^{w_{\iota,m}}\right)} \pmod{p-1}. \tag{35}$$

By (31)

$$d^{W \cdot \rho_\iota^{v_i}} \equiv d^{W/\rho_\iota^{w_{\iota,m}}} \cdot d^{\rho_\iota^{w_i}} \pmod{p-1}. \tag{36}$$

Then $$\rho_i^{w_{\iota,m}} \cdot \rho_i^{v_i} \equiv \rho_i^{w_i} \pmod{\varphi(p-1)}, \tag{37}$$

or $$w_{i,m} + v_i - w_i \equiv 0 \pmod{\varphi(q_i^{\varepsilon_i})}. \tag{38}$$

NOTE 4: In a similar fashion, consider the case when all the $w_j$ other then $w_i$ are congruent to zero modulo $\varphi(q_j^{\varepsilon_j})$.
Assume $w_j \not\equiv 0 \pmod{q_i^{\varepsilon_i}}$ for $j \neq i$. In this case, using (32), it will be $$d^{\rho_\iota^{v_i}} \cdot U/\rho_i^{V_{\iota,m}} \equiv d^{-\rho_\iota^{w_i}} \tag{39}$$

By (32)

$$\rho_i^{v_i} \equiv \rho_i^{v_{\iota,m}} \cdot \rho_i^{w_\iota} \tag{40}$$

or $$v_i \equiv w_i + v_{i,m} \pmod{\varphi(q_j^{\varepsilon_j})}. \tag{41}$$

Compare (38) and (41):

$$w_{i,m} = v_{i,m} \pmod{\varphi(q_j^{\varepsilon_j})}. \tag{42}$$

As a conclusion:
There exists a linear relationship between $v_i$ and $w_i$ modulo $\varphi(q_j^{\varepsilon_j})$.

V. THE TRIAD

Given a pair (a, d), after the determination of the corresponding relationships $(v_i, w_i)$, it is interesting to explore comparable relationships for a pair (d, g), where g is a superprimitive modulo p.

Let $(v_i(A, D), w_i(A, D))$ denote the pair $(v_i, w_i)$ associated with the pair (a, d).

Likewise, let $(v_i(D, G), w_i(D, G))$ denote the pair $(v_i, w_i)$ associated with the pair (d, g).

Then, by (26), $$\begin{cases} \alpha_i^{\sigma_i^{v_i(A,D)}} \cdot \delta_i^{\sigma_i^{w_i(A,D)}} \equiv 1 \pmod{p-1} \\ \delta_i^{\sigma_i^{v_i(D,G)}} \cdot \gamma_i^{\sigma_i^{w_i(D,G)}} \equiv 1 \pmod{p-1} \end{cases} \tag{43}$$

where $$\gamma_i \equiv g^{\frac{\varphi(p-1)}{q_i^{\varepsilon_i}}} \pmod{p-1}. \tag{44}$$

Raising the first of (43) to $\sigma_i^{v_i(D,G)}$ and the second to $\sigma_i^{w_i(A,D)}$ modulo p−1 yields $$\begin{cases} \alpha_i^{\sigma_i^{v_i(A,D)+v_i(D,G)}} \cdot \delta_i^{\sigma_i^{w_i(A,D)+v_i(D,G)}} \equiv 1 \pmod{p-1} \\ \delta_i^{\sigma_i^{w_i(A,D)+v_i(D,G)}} \cdot \gamma_i^{\sigma_i^{w_i(A,D)+w_i(D,G)}} \equiv 1 \pmod{p-1} \end{cases} \tag{45}$$

whence $$\alpha_i^{\sigma_i^{v_i(A,D)+v_i(D,G)}} \equiv \gamma_i^{\sigma_i^{w_i(A,D)+w_i(D,G)}} \pmod{p-1}. \tag{46}$$

This congruence establishes a relationship between $v_i$ and $w_i$ which does not depend on any of the values of $v_j$ and $w_j$, for $i \neq j$. However, this relationship does not identify the value of $v_i$ which is consistent with (6).

NOTE 1: In general, in (27) $w_{i,m}$ depends on the pair (a, d). Therefore, it will be necessary to distinguish $w_{i,m}$ (A, D) from $w_{i,m}$ (D, G). The same observation applies to $v_{i,m}$ (A, D) and $v_{i,m}$ (D, G).

NOTE 2: a and d are primitives modulo p−1. Therefore, they are relatively prime with $\varphi(p-1)$. When a or d are raised to a divisor of $\varphi(p-1)$, such as $\varphi(p-1)/q_i^{\varepsilon_i}$, they produce primitives modulo $\varphi(p-1)$ for the sets $\{\sigma_i^{v_1}\}$ and $\{\sigma_i^{w_1}\}$, respectively.

VI. INVERTIBLE SUPERPRIMITIVES

1) Introduction

Thus far, given a pair (a, d), the relationships between the sets $\{v_i\}$ and $\{w_i\}$ have been based on the condition (14).

It should be emphasized the fact that (14) is defined modulo (p−1) and is only a necessary condition for the solution of (10) and (12). It does not produce the solution of (10) and (12) because no adequate link has been produced between the domain modulo p−1 and the domain modulo p.

To this end, this Section introduces the notion of "Invertible Superprimitive".

2) Definition

A superprimitive of p is defined as invertible if its inverse modulo p is also a superprimitive of p. In general, only some of the superprimitives are invertible. Table III shows the invertible superprimitives of the set of primes which are included in Tables I and II. This congruence establishes a relationship between $v_i$ and $w_i$ which does not depend on any of the values of $v_j$ and $w_j$, for $i \neq j$.

TABLE III

| p | Superprimitives of p | Invertible Superprimitives | Number of Superprimitives | Number of Invertible Superprimitives | Ratio |
|---|---|---|---|---|---|
| 11 | 7 | | 1 | 0 | 0. |
| 23 | 7, 17, 19 | 17, 19 | 3 | 2 | 0.666667 |
| 47 | 5, 11, 15, 19, 33, 43 | 5, 19 | 6 | 2 | 0.333333 |
| 59 | 11, 31, 37, 39, 43, 47, 55 | 11, 43 | 7 | 2 | 0.285714 |
| 107 | 5, 21, 31, 45, 51, 55, 65, 67, 71, 73, 103 | 21, 51 | 11 | 2 | 0.181818 |

TABLE III-continued

| p | Superprimitives of p | Invertible Superprimitives | Number of Superprimitives | Number of Invertible Superprimitives | Ratio |
|---|---|---|---|---|---|
| 167 | 5, 13, 15, 35, 39, 43, 45, 53, 55, 67, 71, 73, 79, 91, 101, 103, 105, 117, 125, 129, 135, 139, 143, 145, 149, 155, 159, 163 | 5, 35, 43, 67, 101, 105, 125, 129, 145, 163 | 28 | 10 | 0.357143 |
| 263 | 29, 57, 67, 85, 87, 97, 115, 119, 127, 130, 139, 141, 161, 171, 185, 197, 213, 219, 227, 229, 237, 241, 247, 251, 255, 257, 259 | 29, 97, 115, 127, 141, 197, 219, 241, 247, 251, 257, 259 | 26 | 12 | 0.461538 |
| 347 | 5, 7, 17, 19, 45, 63, 65, 69, 79, 91, 97, 101, 103, 111, 123, 125, 141, 145, 153, 155, 165, 171, 175, 191, 193, 203, 215, 217, 221, 223, 231, 239, 245, 247, 283, 301, 307, 335, 343, | 17, 69, 79, 103, 123, 171, 245, 283 | 39 | 8 | 0.205128 |
| 359 | 7, 21, 35, 53, 63, 71, 97, 103, 105, 109, 113, 119, 137, 143, 157, 159, 163, 167, 175, 189, 197, 209, 211, 213, 223, 251, 257, 263, 265, 269, 271, 277, 291, 293, 299, 309, 311, 313, 315, 319, 327, 329, 339, 341, 343, 349, 353, 355 | 157, 197, 209, 213, 223, 257, 269, 271, 277, 293, 299, 339, 341, 343, 353, 355 | 48 | 16 | 0.333333 |
| 383 | 33, 35, 47, 53, 61, 83, 89, 91, 95, 99, 105, 111, 123, 127, 131, 141, 145, 151, 157, 167, 179, 181, 183, 187, 233, 247, 249, 253, 267, 285, 297, 307, 315, 337, 355, 359, 365, 367, 369, 379 | 359, 367 | 40 | 2 | 0.05 |
| 479 | 13, 19, 37, 39, 41, 43, 47, 53, 57, 59, 65, 79, 95, 117, 119, 123, 129, 143, 149, 159, 171, 177, 179, 185, 191, 205, 209, 223, 227, 235, 237, 265, 281, 285, 295, 317, 325, 333, 351, 353, 357, 369, 379, 387, 391, 395, 423, 429, 433, 447, 449, 451, 461, 463, 467, 469, 473, 475 | 19, 47, 53, 177, 235, 265, 325, 353, 433, 449, 451, 463 | 58 | 12 | 0.206897 |
| 503 | 19, 29, 37, 53, 55, 57, 71, 87, 107, 109, 111, 127, 133, 137, 139, 159, 163, 165, 167, 191, 193, 203, 213, 215, 239, 269, 277, 295, 305, 307, 313, 321, 327, 333, 341, 347, 349, 371, 381, 385, 399, 409, 417, 419, 437, 453, 457, 461, 467, 471, 475, 479, 481, 485, 487, 489, 495, 499 | 19, 53, 133, 193, 213, 295, 305, 307, 409, 417, 467, 475, 485, 489 | 58 | 14 | 0.241379 |
| 587 | 5, 11, 13, 19, 23, 41, 45, 85, 99, 103, 105, 111, 117, 125, 127, 131, 139, 157, 171, 173, 183, 187, 207, 213, 215, 221, 227, 231, 241, 245, 251, 259, 265, 263, 273, 275, 291, 295, 321, 323, 325, 327, 335, 337, 341, 365, 367, 369, 373, 391, 399, 403, 405, 415, 427, 435, 467, 473, 475, 483, 487, 497, 523, 539, 541, 557, 559, 583 | 11, 85, 111, 117, 215, 221, 241, 275, 291, 321, 341, 415, 427, 435, 475, 523 | 69 | 16 | 0.231884 |

Consider the case when a denotes an invertible superprimitive, and let g denote its inverse modulo p. Then, for some integers v and w, the conditions (10) and (12) take the following forms:

$$a^{a^v} \equiv a^{-1} \pmod{p} \qquad (47)$$

and $$g^{-1} \equiv g^{g^w} \pmod{p}. \qquad (48)$$

Therefore, $$a^{a^v+1} \equiv 1 \pmod{p} \qquad (49)$$

whence $$a^v + 1 \equiv 0 \pmod{p-1} \qquad (50)$$

or $$a^{2 \cdot v} \equiv 1 \pmod{(p-1)} \qquad (51)$$

Similarly, $$g^{2 \cdot w} \equiv 1 \pmod{(p-1)}. \qquad (52)$$

Then $$2 \cdot v \equiv 0 \pmod{\varphi(p-1)} \qquad (53)$$

and $$2 \cdot w \equiv 0 \pmod{\varphi(p-1)}. \qquad (54)$$

NOTE 1: In (53) and (54), v and w cannot be represented as in (19), because, by (17), $\rho_i$ must be relative prime to $\varphi(p-1)$. Thus (19) is applicable only if $$\begin{cases} gcd(v, \varphi(p-1)) = 1 \\ gcd(w, \varphi(p-1)) = 1. \end{cases} \qquad (55)$$

NOTE 2: Compare (56) with (46). The congruence (46) establishes a necessary condition which relates $v_i(A, G)$ and $w_i(A, G)$. For $g \equiv a^{-1} \pmod{p}$, (46) constrains the values of $v(A, G)$ and $w(A, G)$ to be congruent to each other modulo $\varphi(p-1)$ and also to be congruent to zero modulo $\varphi(p-1)$.

These properties will be fundamental in the search for a solution of the problem.

APPENDIX A

NOTES ON ORTHOGONAL PRIMITIVES

I. AN EXAMPLE FOR p−1 CONTAINING ONLY SMALL PRIMES

Let $$a^x \equiv b \pmod{71}, \qquad (A.1)$$

where a and b are primitive roots modulo 71.

Then x is an element of the set X, containing all the integers which are relatively prime to $p-1=70=2\cdot 5\cdot 7$.
Let $$p-1 = 2\cdot q_1 \cdot q_2 \qquad (A.2)$$
$$= 2\cdot 5\cdot 7.$$

The order of X is $\varphi(70)=\varphi(5)\cdot\varphi(7)=24$. The exponent of X is $e(X)=1\,cm(4,6)=12$. Then X can be described as the direct product of a cyclic subgroup of order 2 and a cyclic subgroup of order 12 as follows:

$$X=C_1(2)\times C_2(12). \qquad (A.3)$$

Also, the elements of X can be represented by using orthogonal primitives. In this case, given a selection of $\sigma_1(\text{mod } 7)$ and $\sigma_2(\text{mod } 5)$, $\rho_1(\text{mod } 70)$ and $\rho_2(\text{mod } 70)$ can be computed by letting $$\rho_1 = 1 + \lambda_1 \cdot \frac{p-1}{q_1} = \sigma_1 + \mu_1 \cdot q_1 \qquad (A.4)$$

and $$\rho_2 = 1 + \lambda_2 \cdot \frac{p-1}{q_2} = \sigma_2 + \mu_2 \cdot q_2. \qquad (A.5)$$

For $\sigma_1 \equiv 3(\text{mod } 5)$ and $\sigma_2 \equiv 5(\text{mod } 7)$, it will be $$\begin{cases} \rho_1 \equiv 43(\text{mod } 70) \\ \rho_2 \equiv 61(\text{mod } 70). \end{cases} \qquad (A.6)$$

Then $$x \equiv 43^{x_1} \cdot 61^{x_2} (\text{mod } 70). \qquad (A.7)$$

Given a pair (a, b), to solve (A.1), observe that, by (A.3) and (A.4), $$\begin{cases} \frac{70}{7}\cdot \rho_1 \equiv \frac{70}{7}\cdot \sigma_1 \cdot (\text{mod } 70) \\ \frac{70}{7}\cdot \rho_2 \equiv \frac{70}{7}(\text{mod } 70). \end{cases} \qquad (A.8)$$

Therefore, raising (A.1) to 10 (modulo 71) yields $$\left(a^{10}\right)^{5^{x_1}} \equiv b^{10}(\text{mod } 71). \qquad (A.9)$$

Likewise, raising (A.1) to 14 (modulo 71) yields $$\left(a^{14}\right)^{3^{x_2}} \equiv b^{14}(\text{mod } 71). \qquad (A.10)$$

Then (A.7) produces x.
Therefore, in the example, $x_2$ and $x_1$ can be determined independently of each other.
FIG. 1 shows the elements of X as intersections of vertical and horizontal straight lines through $61^{x_2}(\text{mod } 70)$ and $43^{x_1}(\text{mod } 70)$, respectively.
It is apparent that the elements on a vertical line (constant $x_2$) are congruent to one another modulo $14=2\cdot 7$. Likewise, the elements on a horizontal line are congruent to one another modulo $2\cdot 5=10$.

Also, each elements of X is the product of its horizontal and vertical components.
Different selections of the primitives $\sigma_1$ and $\sigma_2$ would cause appropriate permutations of the vertical and horizontal lines, respectively.

APPENDIX B

THE ORDER OF $\sigma_0$32 4·ODD+1 MODULO $2^{\varepsilon_0}$

When $\sigma_0=4\cdot\text{ODD}+1$, the order of $\sigma_0$ modulo $2^{\varepsilon_0}$ equals $2^{\varepsilon_0-2}$:

$$\sigma_0^{2^{\varepsilon_0-2}} \equiv 1(\text{mod } 2^{\varepsilon_0}). \qquad (B.1)$$

Consider the case when $\sigma_0=4\cdot\text{ODD}+1$. Then $$\begin{cases} \sigma_0 \equiv 4\cdot(2\cdot k+1)+1(\text{mod } 2^{\varepsilon_0}) \\ \quad \equiv 1+2^2+8\cdot k(\text{mod } 2^{\varepsilon_0}) \\ \sigma_0^2 \equiv 1+2^3+16\cdot k_1(\text{mod } 2^{\varepsilon_0}) \\ \sigma_0^4 \equiv 1+2^4+32\cdot k_2(\text{mod } 2^{\varepsilon_0}) \\ \quad \cdots\cdots\cdots\cdots\cdots\cdots\cdots\cdots \\ \sigma_0^{2^{\varepsilon_0-3}} \equiv 1+2^{\varepsilon_0-1}(\text{mod } 2^{\varepsilon_0}) \\ \sigma_0^{2^{\varepsilon_0-2}} \equiv 1(\text{mod } 2^{\varepsilon_0}). \end{cases} \qquad (B.2)$$

($k$, $k_1$, $k_2$ integers).
Notice that the integer $\sigma_{0,0} \equiv -1+2^{\varepsilon_0-1}$ cannot be produced as a power of $\sigma_0$.

By using the methods described herein, the encrypted data in the memory is decoded in a time of an order of log log $p\cdot\log^2 p$ by computing the data's discrete logarithm. This speed is important, which only the operation of the second computer performing the second computer generated steps can achieve, because by having this speed for factoring, the signal representative of an encrypted message can be effectively decrypted and deciphered in real time so any threat to property or individuals can be quickly acted upon to eliminate the threat before it occurs and actual damage to property or injury to individuals is prevented or mitigated. In other words, for an encrypted message to be effectively understood, it must by decrypted fast enough that any threat identified in the signal can be stopped. The present invention with the use of the second computer allows for this capability. Here, it is inherent that to save lives if required, the second computer is required.

There may be the step of obtaining the electromagnetic signal representative of a message from a telecommunications network, or a data network or an Internet or a non-transient memory. Law enforcement departments, such as Homeland Security, the FBI, the CIA, NSA, state and local Police or the Military have the well-known capability of obtaining or intercepting messages sent encrypted by a first computer operated by a potential terrorist or criminal as an electromagnetic signal, such as by smart phone or computer or internet, or stored in the memory of a smart phone or computer, or a flash drive. The encrypted electromagnetic signal can be extracted from such messages or memories and operated upon by the techniques described herein to decrypt the encrypted messages and read them to determine whether there is any violation of law or threat to property or individuals. Of course, the intended recipient of the encrypted message by the first computer has the key so the recipient can decrypt the encrypted message the recipient has received and understand it. It is the object of this invention, and the problem this invention solves, to allow a recipient of the encrypted message who does not have the key to read it, to determine what the key is by the techniques described here to compute the data's discrete logarithm, and then using the determined key, decrypting the encrypted message, reviewing what the decrypted message says, and acting as necessary to protect property damage or bodily injury or any type of crime, as deemed appropriate.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

REFERENCES, all of which are incorporated by reference herein.

[1] T. M. Apostol, *Introduction to Analytic Number Theory*, New York, NY: Springer-Verlag, 1976.
[2] G. H. Hardy, E. M. Wright, *An Introduction to the Theory of Numbers*, Oxford, UK: Clarendon Press, 1979.
[3] S. C. Pohlig, M. E. Hellman, "An Improved Algorithm for Computing Logarithms over GF(p) and its Cryptographic Significance", *IEEE Trans, Inform. Theory*, Vol IT-24, pp. 106-110, 1978.

The invention claimed is:

1. A method for reading an encrypted message as an electromagnetic signal representative of encrypted data comprising the steps of:
   entering the encrypted message as the electromagnetic signal into a computer;
   decrypting by the computer the encrypted message as the electromagnetic signal in a time of the order of log log p x log squared p by selecting with the computer primitives of sub-groups of a group stored in a non-transient memory, where the group is defined modulo $\phi(p-1)$ in such a way that an exponent of any one primitive is independent on an exponent of any other primitive, thus reducing the complexity of a search for such exponents to a number of operations of the order of a sum of such exponents as opposed to their product to obtain a decrypted message as a decrypted electromagnetic signal;
   determining if there is any threat in the decrypted message as the decrypted electromagnetic signal; and
   acting on the decrypted message as the decrypted electromagnetic signal with the computer so any threats to property or individuals can be quickly acted upon to eliminate the threat before it occurs and actual damage to property or injury to individuals is prevented or mitigated.

* * * * *